United States Patent
Horovitz et al.

(10) Patent No.: US 6,189,365 B1
(45) Date of Patent: Feb. 20, 2001

(54) METHOD FOR ESTIMATING THE ACCURACY OF AN OPTICAL DISTANCE MEASURING PROBE

(75) Inventors: Gabi Horovitz, Misgav; David Bunimovich, Netanya, both of (IL)

(73) Assignee: Nex Tec Ltd., Haifa (IL)

( * ) Notice: Under 35 U.S.C. 154(b), the term of this patent shall be extended for 0 days.

(21) Appl. No.: 09/213,772

(22) Filed: Dec. 17, 1998

(51) Int. Cl.$^7$ .................................................. G01B 11/24
(52) U.S. Cl. ............................................................. 73/1.81
(58) Field of Search .................................. 73/1.79, 1.81; 356/376

(56) References Cited

U.S. PATENT DOCUMENTS 5,193,124 * 3/1993 Subbarao .
5,796,483 * 8/1998 Nakayama .

* cited by examiner

Primary Examiner—Robert Raevis
(74) Attorney, Agent, or Firm—Mark M. Friedman

(57) ABSTRACT

A method for estimating the error of a measured shape of a workpiece, as measured using an optical probe. A series of N equally spaced distance measurements are transformed to a power spectrum. The average power above a cutoff index is divided by N to give an estimate of the variance of the shape measurement.

4 Claims, 3 Drawing Sheets

Measured distances

Spectrum though the k=N-1, are measured at N equally spaced lateral

METHOD FOR ESTIMATING THE ACCURACY OF AN OPTICAL DISTANCE MEASURING PROBE

FIELD AND BACKGROUND OF THE INVENTION

The present invention relates to distance measurements and, more particularly, to a method for estimating the accuracy of an optical probe used to measure the shape of a workpiece.

Optical probes are used in manufacturing to measure the shape of a workpiece, by scanning the surface of the workpiece using such a probe and measuring a series of distances to the surface of the workpiece. Representative optical probes that are used for this purpose include the WIZ probe, manufactured by Nextec of Tirat Hacarmel, Israel, the OTP6M optical trigger probe system, manufactured by Renishaw PLC of Wotton-under-Edge, UK, and the ITS Laser Triangulation Sensor Heads, manufactured by Gesellschaft für Messtechnik mbH of Aachen, Germany. The accuracy of these probes is measured by calibrating them, using standard objects of known shape. In practice, this is not totally satisfactory, because the accuracy of the measured distances to real workpieces depends, in general, on surface properties of the workpieces, particularly surface finish, but also surface color, surface emissivity and other optical characteristics; and the surface properties of such workpieces generally are different than the surface properties of the standard calibration objects.

There is thus a widely recognized need for, and it would be highly advantageous to have, a method of estimating the accuracy of measurements of distance from an optical probe to a workpiece, based on those measurements themselves, and not on measurements made using a standard calibration object.

SUMMARY OF THE INVENTION

According to the present invention there is provided a method for estimating the accuracy of a set of distance measurements to a workpiece, the distance measurements obtained by steps including illuminating successive locations along the workpiece, comprising: (a) computing a power spectrum of the distance measurements; (b) selecting a cutoff index; and (c) inferring the accuracy of the measurements from said power spectrum at indices above said cutoff index.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for estimating the accuracy of distance measurements. The present invention can be used to estimate the accuracy of the measured shape of a workpiece, as measured by an optical probe.

The principles and operation of distance accuracy estimation according to the present invention may be better understood with reference to the drawings and the accompanying description.

Figure 1:
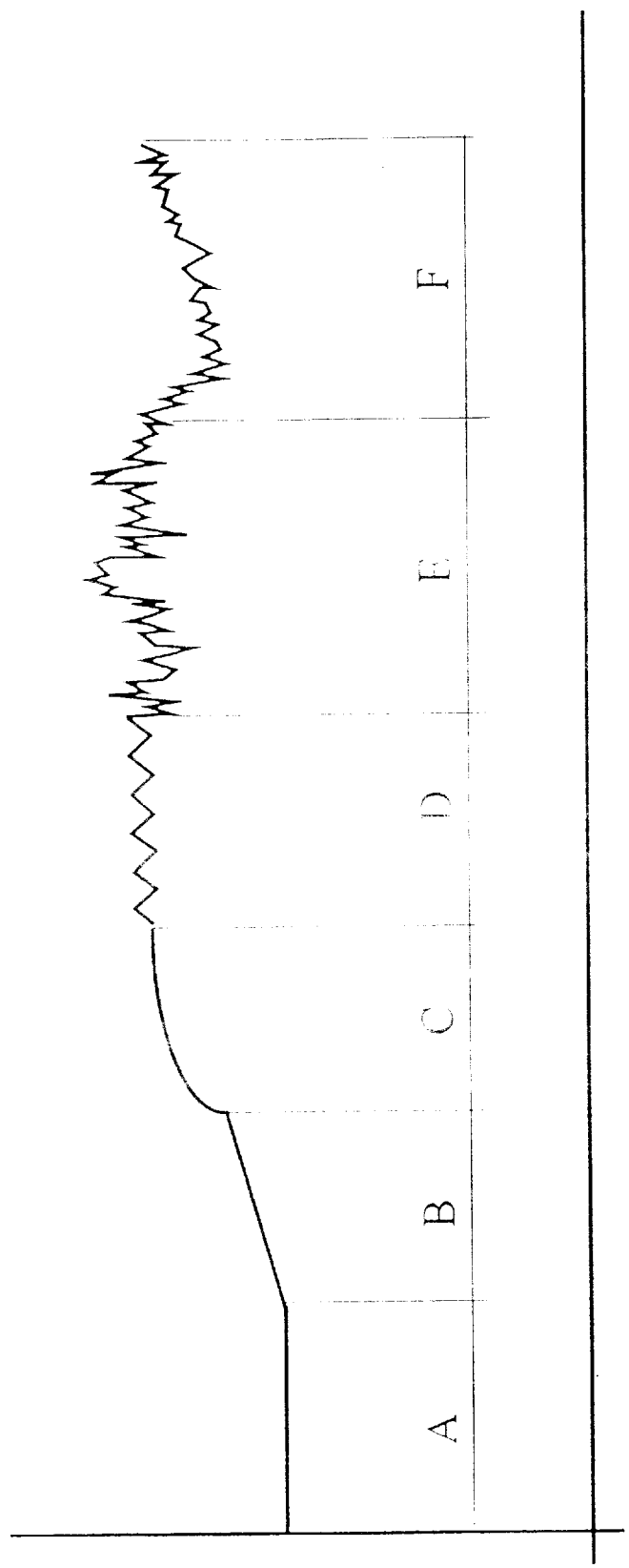
FIG. 1 is a conceptual illustration of a series of shape measurements.

Referring now to the drawings, the line segments of FIG. 1 illustrate, conceptually, a series of shape measurements. Segments A through D are absolutely perfect measurements, without any error. Segments E and F include measurement error. Segment A represents the shape of a flat, horizontal workpiece. Segment B represents the shape of a flat, inclined workpiece. Segment C represents the shape of a curved workpiece. Segment D represents the shape of a workpiece having an irregular surface. Segment E is segment A with added measurement noise. Segment F represents a noisy measurement of the shape of a curved workpiece.

All these segments represent the distance h measured as a function of lateral position x, i.e., h(x). The present invention estimates the error in h(x) from the power spectrum of h(x). Specifically, N distances $h_k$ indexed from k=0 through k=N-1, are measured at N equally spaced lateral positions $X_k$. It is assumed that the measurement errors are uncorrelated and obey a Gaussian distribution with zero mean and variance $\sigma^2$. To ensure that the measurement errors are uncorrelated, $x_k$ is selected larger than the width of the spot of light that is projected on the workpiece by the probe. Note that the units of $\sigma$ are distance. The discrete Fourier transform of the dataset $\{h_k\}$ is the set of N complex numbers $$H_n = \sum_{k=0}^{N-1} h_k \exp(2\pi i k n / N)$$

Because the $h_k$ are real, $H_n^* = H_{N-n}$. The power spectrum is the set of absolute values of $H_n$, $\{|H_n|^2\}$. Note that $|H_n|^2 = |H_{N-n}|^2$, so in practice only the indices n=0 through n=N|2 need to be considered.

Consider first segment A of FIG. 1. Its power spectrum is non-zero only at $H_0$. The assumed statistical properties of the measurement errors imply that the expectation value of the power spectrum components of non-zero index is:

$<|H_n|^2> = N\sigma^2$

Therefore, according to the present invention, the error in a measurement of the shape of a flat, horizontal workpiece is estimated by averaging the power spectrum components of non-zero index:

$$\sigma^2 = \frac{2}{N(N-2)} \sum_{n=1}^{\frac{N}{2}-1} |H_n|^2$$

Note that the Nyquist sample $H_{N|2}$ is excluded from the sum if N is even.

Figure 2:
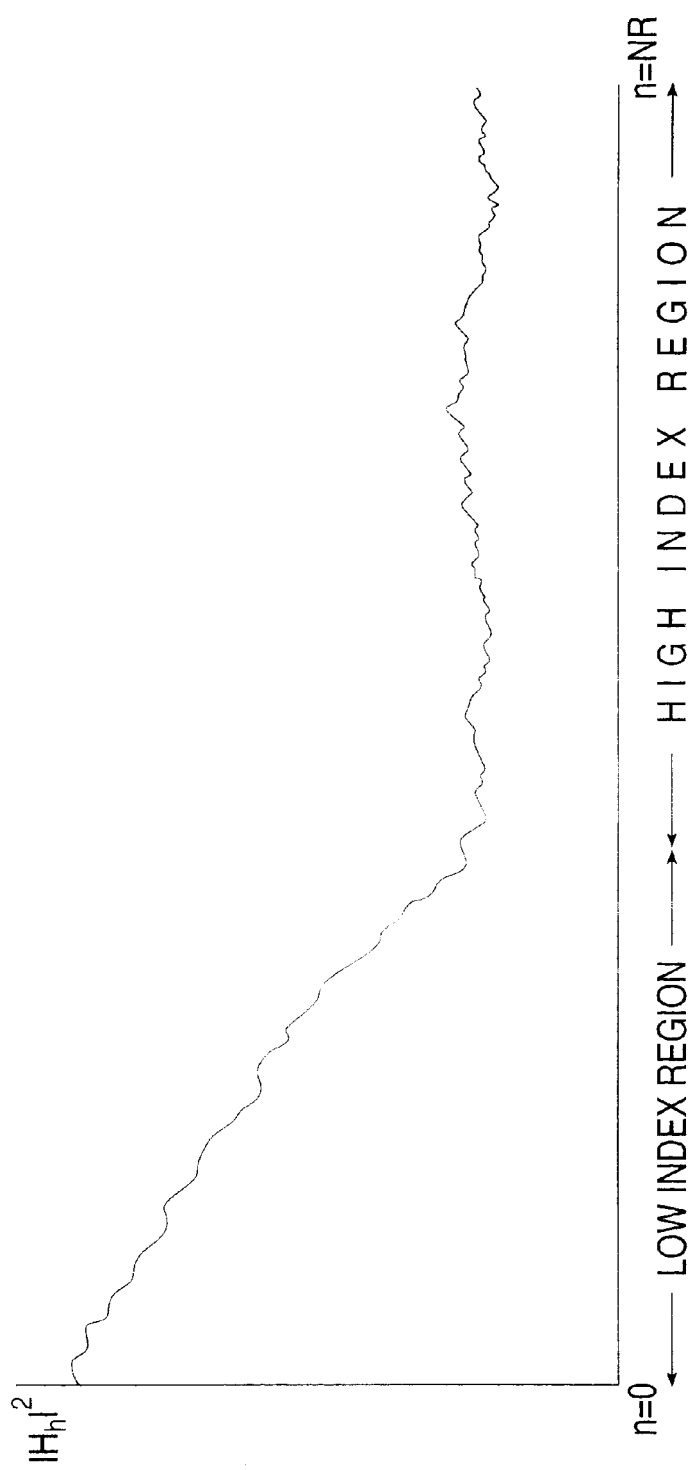
FIG. 2 is a conceptual illustration of a power spectrum

More generally, the power spectra of segments such as segments B, C and D of FIG. 1 are smooth, typically monotonically decreasing functions of index n. The power spectrum of a periodic function such as segment D actually is peaked at a low, non-zero index, but decreases smoothly at higher indices. By contrast, the noise power spectrum is, by assumption, white, uncorrelated and Gaussian. The optical characteristics of the surface tend to vary laterally on a distance scale much shorter than the distance scale appropriate to geometric variations, and therefore can be treated as part of the white noise. Therefore, as illustrated conceptually in FIG. 2, a measured power spectrum can be partitioned, by inspection, into two regions, a low index region, up to a cutoff index $N_c$, dominated by the true power spectrum of the shape of the workpiece, and a high (up to Nyquist) index region, beyond the cutoff index $N_c$, dominated by the noise. The average power in the high index region, i.e., the average value of $|H_n|^2$ in the high index region, is divided by N to give an estimate of the variance $\sigma^2$ of the measurement error:

$$\sigma^2 = \frac{2}{N(N-2N_c)} \sum_{n=N_c}^{\frac{N}{2}-1} |H_n|^2$$

Figure 3:
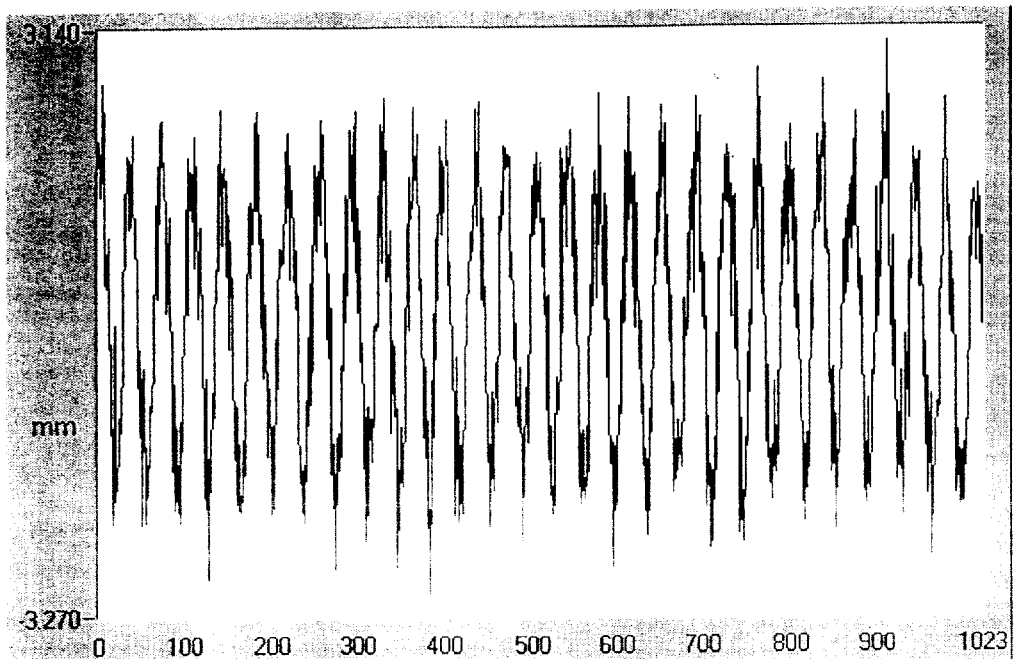
FIG. 3 is an example of a distance measurement dataset and the corresponding power spectrum.
Figure 3:
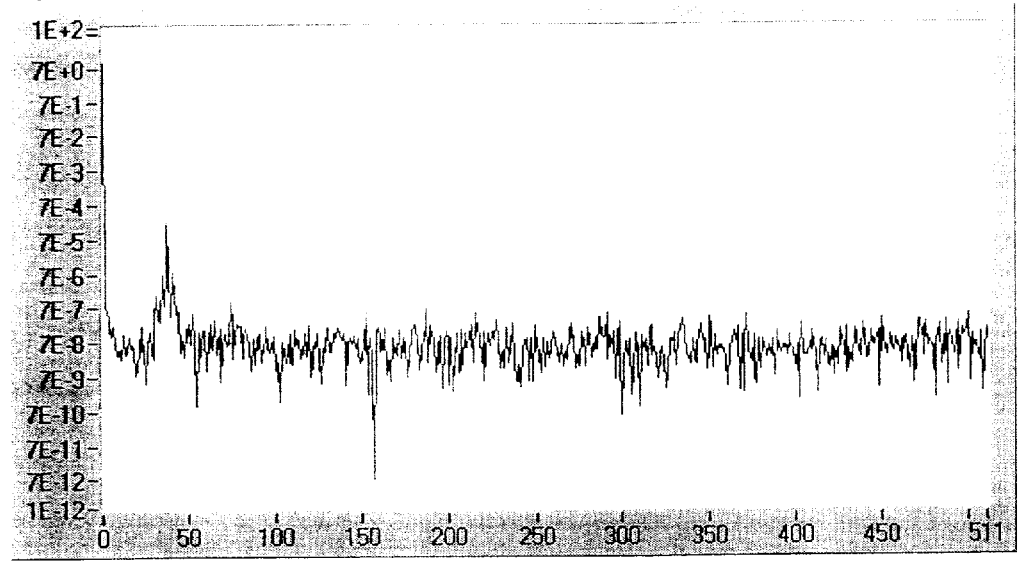

FIG. 3 shows a plot of a dataset of 1024 measured distances $\{h_k\}$ for a an object with a periodic variation in texture (such as segment D of FIG. 1 but with measurement noise), and a plot of the corresponding power spectrum. In the upper plot, the abscissa is sample number and the ordinate is distance, in millimeters. In the lower plot, the abscissa is sample number, from DC to Nyquist, and the ordinate is spectral power divided by the square of the number of samples. The geometric variation of the workpiece is concentrated to the left of spectral sample $H_{35}$. The standard deviation $\sigma$ of the full dataset (excluding the DC sample) is 0.027 mm. The standard deviation $\sigma$ of the distance error, based on spectral samples to the right of $H_{40}$, is 0.011 mm. This standard deviation is insensitive to the exact value chosen for $N_c$, as long as this value is in the flat (white) part of the spectrum.

$N_c$ can not generally be chosen in advance for all workpieces, because it depends on:

1. How the workpiece was processed (machining, etching, etc.).
2. Surface treatment undergone by the workpiece.
3. The distance between successive distance measurements.

In practice, $N_c$ is determined empirically for each workpiece, as follows. $\sigma^2$ is calculated for the samples of the power spectrum between index 3N/8 and index N/2 (i.e., for the rightmost 25% of the samples to the left of the Nyquist index). The number of samples included in the calculation of $\sigma^2$ is increased by including samples of lower and lower index until the change in the value of $\sigma^2$ obtained by adding another sample to the calculation is statistically significant. The relevant statistical computations are described, for example, in William H. Press, Saul A. Teukolsky, William T. Vetterling and Brian P. Flannery, Numerical Recipes in C, Second Edition (Cambridge, 1992), pp. 615–626.

Preferably, the measurements used to obtain $\{h_k\}$ are spaced apart at the lateral resolution of the optical probe. For example, the lateral resolution of the WIZ probe is about 30 microns. The accuracy with which the optical probe is positioned should be within ⅕ of this lateral resolution.

Preferably N is a number for which the discrete Fourier transform can be computed using a fast Fourier transform algorithm. The most well known fast Fourier transform algorithm assumes that N is an integral power of 2. Fast Fourier transform algorithms also are known for N of the form $2^p 3^q 5^r$, where p, q and r are integers, so for example N=200 is a convenient value for many applications. Preferably, the measurements are repeated at the maximum and minimum working distances of the optical probe, and also at at least one intermediate distance. Also preferably, the measurements are repeated at the minimal and maximal angles of attack specified for the optical probe.

The method of the present invention can be incorporated easily in the operational protocol of a computerized measuring machine based on an optical probe, and can be utilized for each measured part for estimation of the real measurement error.

While the invention has been described with respect to a limited number of embodiments, it will be appreciated that many variations, modifications and other applications of the invention may be made.

What is claimed is:

1. A method for estimating the accuracy of a set of distance measurements to a workpiece, the distance measurements obtained by steps including illuminating successive locations along the workpiece, comprising:

(a) computing a power spectrum of the distance measurements;
    (b) selecting a cutoff index; and
    (c) inferring the accuracy of the measurements from said power spectrum at indices above said cutoff index.

2. The method of claim 1, wherein said inferring is based on an average power above said cutoff index.

3. The method of claim 1, wherein said selecting of said cutoff index is effected by steps including:

(i) computing a variance of said power spectrum at a set of indices below a Nyquist index;
    (ii) adding successively lower indices to said set; and
    (iii) for each said successively lower index, computing said variance of said power spectrum of said set; said cutoff index being said successively lower index whereat said computed variance first changes significantly relative to an immediately preceding said computed variance.

4. The method of claim 3, wherein said set initially includes indices between three-quarters of said Nyquist index and said Nyquist index.

* * * * *

UNITED STATES PATENT AND TRADEMARK OFFICE
CERTIFICATE OF CORRECTION

PATENT NO. : 6,189,365 B1
DATED : February 20, 2001
INVENTOR(S) : Gabi Horovitz et al.

Page 1 of 1

It is certified that error appears in the above-identified patent and that said Letters Patent is hereby corrected as shown below:

<u>Title page,</u>
Item [73], please correct Assignee as follows:
-- Assignee: Nextec, Ltd., Haifa, Israel --

Signed and Sealed this

Twenty-eighth Day of May, 2002

*Attest:*

JAMES E. ROGAN
*Attesting Officer*     *Director of the United States Patent and Trademark Office*